Patented July 2, 1946

2,403,071

UNITED STATES PATENT OFFICE 2,403,071

CAUSTIC PRODUCTS

Clyde B. Gardenier, Belleville, N. J., assignor to Thomas A. Edison, Incorporated, West Orange, N. J., a corporation of New Jersey No Drawing. Application November 29, 1941, Serial No. 421,076

11 Claims. (Cl. 252—192)

This invention relates to caustic products and, more particularly, to a means and method for producing caustics in a highly active and available state having a hard porous structure.

My invention has especial application and utility in connection with closed systems of respiration, and is herein described in connection with such rebreathing system or apparatus; however, no unnecessary limitation of my invention to this particular application is intended.

A rebreathing apparatus is provided with a canister containing an acid gas absorbent through which the exhaled gases are drawn to be cleared of carbon dioxide. In a rebreathing apparatus for use in subfreezing temperatures—such as that employed in high-altitude flying—the absorbent is called upon both to clear the exhalant of carbon dioxide and moisture, and also to provide a sufficient heat of reaction and of solution to prevent freezing of the moisture in the system and a possible stoppage of gas flow through the absorbent. An absorbent which has been employed for this purpose is sodium hydroxide known otherwise as caustic soda. This caustic soda has been used in a substantially pure state as in the physical form of small solid chunks, particles or granules, or in larger cakes of a pancake or cuplike shape.

The various solid forms of caustic soda which have been thus used have had the distinct disadvantage that they present a relatively small surface to the exhalant for the amount of the caustic soda provided. Since, in the action of the caustic soda, its surface soon becomes coated with moisture absorbed from the exhalant, leaving effectively still less of the caustic soda exposed to the exhalant to absorb further moisture and carbon dioxide, the use of the caustic soda in this solid state is characterized by a very low absorptive activity. Also, because of the highly hygroscopic character of the caustic soda, it will pick up sufficient moisture to dissolve into a semi-fluid state. As a result, the partially dissolved chunks, particles or cakes of the material will compact and flow together into a semi-fluid mass and thus not only reduce still further its surface exposure to the exhalant but become even substantially impervious to the flow of gases therethrough. This semi-fluid state of the caustic soda renders it both unsafe for further use in the rebreathing system and hazardous to replace and handle because of its highly caustic and corrosive nature.

In my invention, I overcome the above-noted disadvantages encountered in the use of caustic soda. This is accomplished by providing the caustic soda in a highly poriferous state similar to that of a sponge or honeycomb, and by providing a finely dispersed skeleton to hold the caustic in a fixed spatial relationship even when the same is spent and in a semi-fluid state. In this way, a high ratio of surface exposure to the exhalant is attained per unit of mass of the material employed, and flow of the caustic soda is prevented in the normal use thereof. The caustic soda thus remains pervious to gases throughout its use, maintains a high absorptive rate and quantitative efficiency, and is more safe to use and to handle.

It is accordingly an object of my invention to provide a new and improved structural form of a caustic product affording new and more advantageous uses therefor, and further to provide a highly porous product composed predominantly of a caustic alkali and held in a substantially permanent structural form while maintaining the desirable characteristics of the caustic alkali.

Other objects are to provide a caustic product in a state having a substantially greater porosity and consequently greater ratio of effectively exposed surface per unit of mass of the material than has been heretofore attained; to provide a skeleton for holding exposed minute quantities of caustic alkali in fixed spatial relation whereby to maintain the caustic alkali in a pervious state even when the same has been spent; and to provide such a skeleton which is itself an efficient acid gas absorbent and dehydrating agent.

For obtaining the porous structure of my product, my invention contemplates fusing a caustic alkali and adding a substance thereto having such properties that it will mix homogeneously with the alkali and produce a soft paste, and will also at a proper temperature partially react with the alkali to generate a gas and expand the paste into a spongy mass, much as in the manner of raising bread. I find that pure cellulose, such as cotton linters, is a substance having these desired properties; I may however use cellulose-containing materials such as wood, glue, horn, leather or hair. To produce one preferred form of my invention, for example, about three parts of cotton linters, by weight, are mixed with one hundred parts of fused caustic soda at approximately 200° C. This mix is then heated to about 220° C., at which temperature a reaction starts between the cellulose and caustic alkali to generate gas and convert the mix into a spongy mass. When this mass is then cooled rapidly and thereafter dried, it sets into a hard, brittle product having a porous structure much like that of an ordinary marine animal sponge or honeycomb—i. e., a structure having many cavities coupled through interstices and branching into relatively large orifices opening to the surface of the product. These cavities, interstices and orifices render the caustic product highly permeable, provide a large surface exposure to the ambient per unit of mass of the product, and thus increase the absorptive capacity and activity of the product.

It is known that certain of the cellulose hydroxyl groups exhibit feebly acid properties and will react with bases to form corresponding salts. Accordingly, it is believed that some of the cellulose hydroxyl groups react with the sodium hydroxide to form a sodium salt of cellulose, or additive compound of sodium hydroxide, and that other of the hydroxyl groups react with the sodium hydroxide to produce sodium oxalate and hydrogen gas according to the following equation:

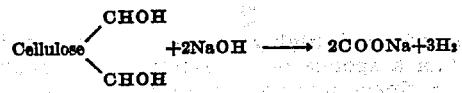

$$\text{Cellulose}\begin{matrix}\text{CHOH}\\ \diagup\\ \diagdown\\ \text{CHOH}\end{matrix} + 2\text{NaOH} \longrightarrow 2\text{COONa} + 3\text{H}_2$$

This hydrogen which is emitted becomes diffused throughout the fusion and serves to retain the same in a porous form as it is set in structure by cooling and drying.

The product formed by thus adding cellulose to caustic soda is highly caustic and has a high qualitative and quantitative efficiency of absorption for moisture and the acid gases. The product has also a high structural strength, but is yet subject to loss in structure when it is saturated with moisture, however to considerably less extent than is the case of pure caustic soda.

I have found though that this tendency of the caustic product to lose its structure when saturated with moisture can be overcome effectively by adding a water soluble silicate, such as of sodium or potassium but preferably of the former, to the caustic soda-cellulose product above described. (Alternatively, I may merely add silica as an original ingredient as this will react with the caustic soda to produce sodium silicate.) This silicate is introduced into the original sodium hydroxide cellulose fusion, with which it mixes homogeneously. When the fusion is cooled and dried the sodium silicate acts as a binder and hardener, and provides a skeleton for the sodium hydroxide and the cellulose sodium-hydroxide reaction products. While the silicate here employed is initially water soluble, it tends to lose this water soluble characteristic when once sufficiently heated to remove waters of crystallization. In preparing my final product, as is hereinafter explained, the silicates are so heated in the hydroxide-cellulose fusion. Accordingly, the skeleton thus formed is rendered substantially insoluble and constitutes a rigidifying framework for the caustic product. Hence, the skeleton serves to preserve a high surface exposure to the ambient per unit of mass of the product and to maintain the product with a high degree of permeability throughout its normal use. Yet the skeleton does not materially impair the absorptive capacity and activity of the sodium hydroxide-cellulose product, as the sodium silicate is itself an active acid-gas absorbent and a dehydrating agent when in a dry state.

The preparation of a given quantity of my preferred final product may be carried out as follows: About 136 pounds of solid sodium hydroxide is fused with about 50 pounds of 40° Baumé sodium silicate at approximately 200° C. To this fusion there is added successively, in one-pound portions, about six pounds of pure cellulose such as of cotton linters, the fusion being agitated after the addition of each portion until the same, which is in the nature of a gel, is homogeneous. The temperature of the fusion is then raised rapidly to 220° C., at which point a reaction begins as is evidenced by a copious generation of hydrogen gas and a sudden rise in temperature of the fusion resulting from the addition of a heat of reaction to the externally applied heat. When the temperature has risen to approximately 330° C., the reaction is complete, leaving hydrogen gas dispersed throughout the fusion. The fusion is then cooled rapidly in any suitable way, as by the use of a water-cooled jacket. Upon so cooling the fusion, the evolved hydrogen bubbles within the solidifying mass serve to produce a porous solid product. The final product so obtained contains approximately 85% sodium hydroxide in a highly active and available form.

When I use silica as an initial ingredient in place of a water soluble silicate, the proportions of the ingredients in my preferred product are approximately 140 pounds of caustic soda, 15 pounds of silica and 6 pounds of cellulose. On a general basis the products of my invention are obtained by using the ingredients in about the ratio of 35 moles of caustic alkali, 2½ moles of silica and .37 mole of cellulose.

While the preferred form of my invention is obtained by adding the silica or silicate ingredient to the caustic alkali-cellulose product above described, it will be understood that my invention contemplates also as additional new and useful products the product obtained by providing dispersed water soluble silicate in dehydrated form through a caustic alkali which is in a substantially pure and solid state, especially both for the rigidity and resistance to erosion and for the moisture-absorptive power which the dehydrated silicate imparts to the product.

I claim:

1. A hard porous composition of matter produced by fusing a mixture of a major proportion of caustic alkali and a minor proportion of a cellulose-containing material and a member of the group consisting of silica and water-soluble silicates, reacting said mixture at a temperature above fusing so that a gas is generated and a porous structure is produced, and cooling so as to harden the porous product.

2. A hard porous composition of matter produced by fusing a major proportion of caustic soda and a minor proportion of a material consisting substantially of cellulose and of a member of the group consisting of silica and sodium silicate, reacting said mixture above fusing temperature so that a gas is generated and a porous structure is produced, and cooling so as to harden the porous product.

3. A hard porous caustic product produced by fusing a mixture of caustic alkali, cellulose and a member of the group consisting of silica and water-soluble silicates at a temperature of approximately 200° C., reacting said mixture at temperatures between approximately 220° C. and 330° C. so that a gas is generated and a porous structure is produced, and cooling to harden the porous product.

4. A substantially dry caustic composition of matter comprising the ingredients resulting from fusing and reacting caustic alkali, a cellulose-containing material and a member of the group consisting of silica and the water-soluble silicates.

5. A caustic composition of matter comprising the ingredients resulting from fusing and reacting approximately, by weight, 140 parts of caustic soda, 15 parts of silica and 6 parts of cellulose.

6. As a new product for the absorption of moisture and acidic gases, a dry material composed predominantly of dehydrated caustic alkali and containing a minor proportion of dispersed water-soluble silicate in substantially dehydrated form, said silicate giving structural rigidity to said material, and said silicate being a dehydrating agent and acid gas absorbent.

7. A substantially dry product for the absorption of moisture and acidic gases composed predominantly of caustic alkali and containing a material amount of water-soluble silicate, said silicate being substantially dehydrated of water of crystallization, and said silicate giving structural rigidity to said product.

8. A substantially dry caustic product produced by fusing a mixture of a major proportion of caustic alkali and a minor proportion of water-soluble silicate at temperatures sufficiently high to substantially dehydrate the product, and cooling to harden said product.

9. A substantially dry caustic product for the absorption of acidic gases produced by fusing a mixture of a major proportion of caustic alkali and a minor proportion of a cellulose-containing material, reacting said mixture at a temperature above fusing so that the product is dehydrated and a gas is generated to produce a porous structure, and cooling so as to harden the porous product.

10. A method of preparing substantially pure caustic alkali in porous form which comprises fusing the alkali with a minor proportion of a material having the capability of reacting with the alkali at a temperature above fusing so that a gas is generated and a porous structure is produced, and cooling so as to harden the porous product.

11. A method of preparing caustic alkali in porous form which comprises fusing a mixture of caustic alkali and a cellulose-containing material, reacting said mixture at a temperature above fusing so that a gas is generated and a porous structure is produced, and cooling to harden the product.

CLYDE B. GARDENIER.